United States Patent [19]
Aggarwal et al.

[11] Patent Number: 5,629,248
[45] Date of Patent: *May 13, 1997

[54] MODIFIED GERMANIUM SULFIDE GLASS

[75] Inventors: Ishwar D. Aggarwal, Fairfax Station; Celia I. Merzbacher, Alexandria, both of Va.; Barry B. Harbison, Dinkirk, Md.; John M. Jewell, Taunton, Mass.

[73] Assignee: The United States of America as represented by the Secretary of the Navy, Washington, D.C.

[*] Notice: The term of this patent shall not extend beyond the expiration date of Pat. No. 5,599,751.

[21] Appl. No.: 541,391

[22] Filed: Oct. 10, 1995

[51] Int. Cl.$^6$ .............................. C03C 3/32; C03C 4/10; C03C 13/04
[52] U.S. Cl. ................. 501/40; 501/35; 501/37; 501/904
[58] Field of Search ................. 501/40, 35, 37, 501/904

[56] References Cited

U.S. PATENT DOCUMENTS

| | | | |
|---|---|---|---|
| 4,612,294 | 9/1986 | Katsuyama et al. | 501/40 |
| 4,704,371 | 11/1987 | Krolla et al. | 501/40 |
| 4,962,995 | 10/1990 | Andrews et al. | 350/96.34 |
| 5,315,434 | 5/1994 | Mizuno et al. | 359/355 |
| 5,379,149 | 1/1995 | Snitzer et al. | 501/40 |
| 5,398,584 | 3/1995 | Aitken et al. | 501/40 |

FOREIGN PATENT DOCUMENTS

| | | | |
|---|---|---|---|
| 2223319 | 10/1974 | France | 501/40 |
| 2419385 | 11/1974 | Germany | 501/40 |

OTHER PUBLICATIONS

M. Xilai, Z. Mingli, Y. Peihong, and G. Fuxi, "Study on Ge–Ga–X (X=S,Se) Glass Systems", Collected Papers, XIV International Congress on Glass, pp. 118–127 (1986).

Primary Examiner—Mark L. Bell
Assistant Examiner—Louis M. Troilo
Attorney, Agent, or Firm—Thomas E. McDonnell; George A. Kap

[57] ABSTRACT

A preferred embodiment of a sulfide glass with improved mechanical and optical properties such as extended transmission in the infrared region of radiation having wavelengths of up to about 15 microns, Tg in the range of 370°–550° C., and thermal stability of 100°–300° C., containing, on mol basis, 36–72% germanium sulfide, 2–38% gallium sulfide and/or indium sulfide, and 26–62% of at least one modifier containing an alkaline earth sulfide. A process for making glass of improved mechanical and optical properties comprises the steps of mixing glass components, including an alkaline earth modifier in elemental or sulfide form; melting the glass components in an inert vessel contained in a sealed ampoule to form a molten mixture; cooling the molten glass mixture to a solid state; annealing the solid glass; and cooling the annealed glass to about room temperature. The glass components can be in elemental form or in sulfide form, and if in elemental form, then sufficient amount of sulfur is added to form sulfides of the glass components.

8 Claims, 6 Drawing Sheets

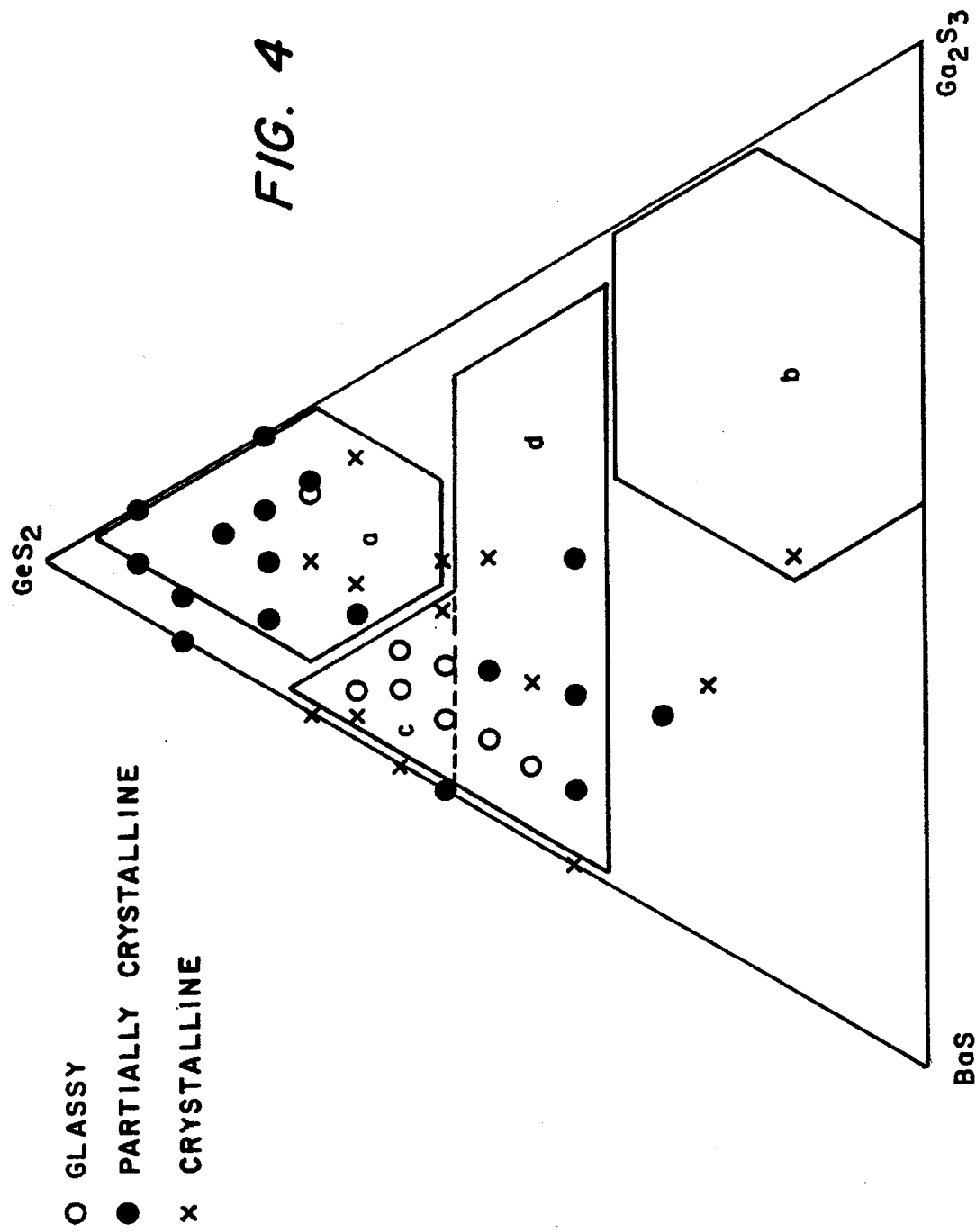

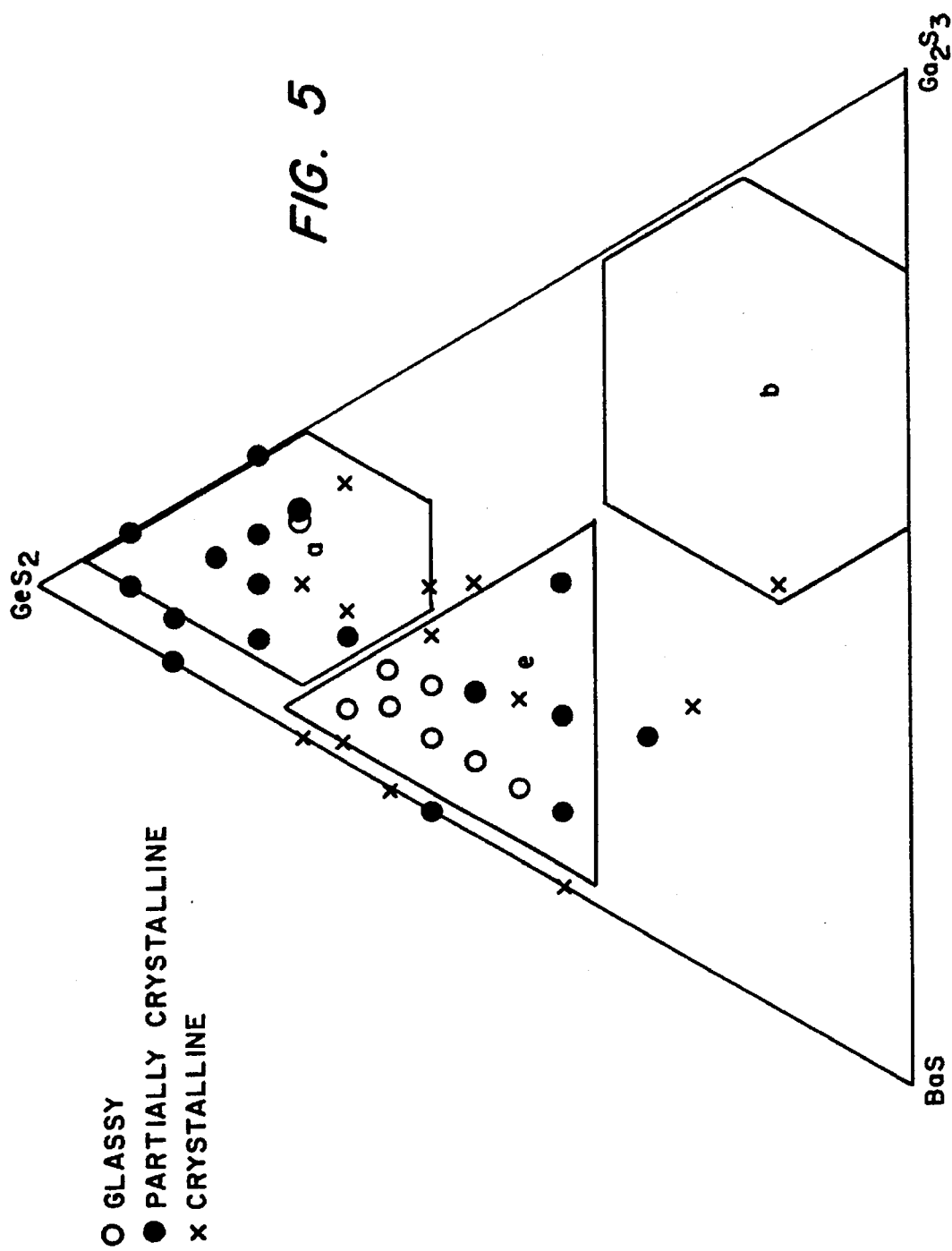

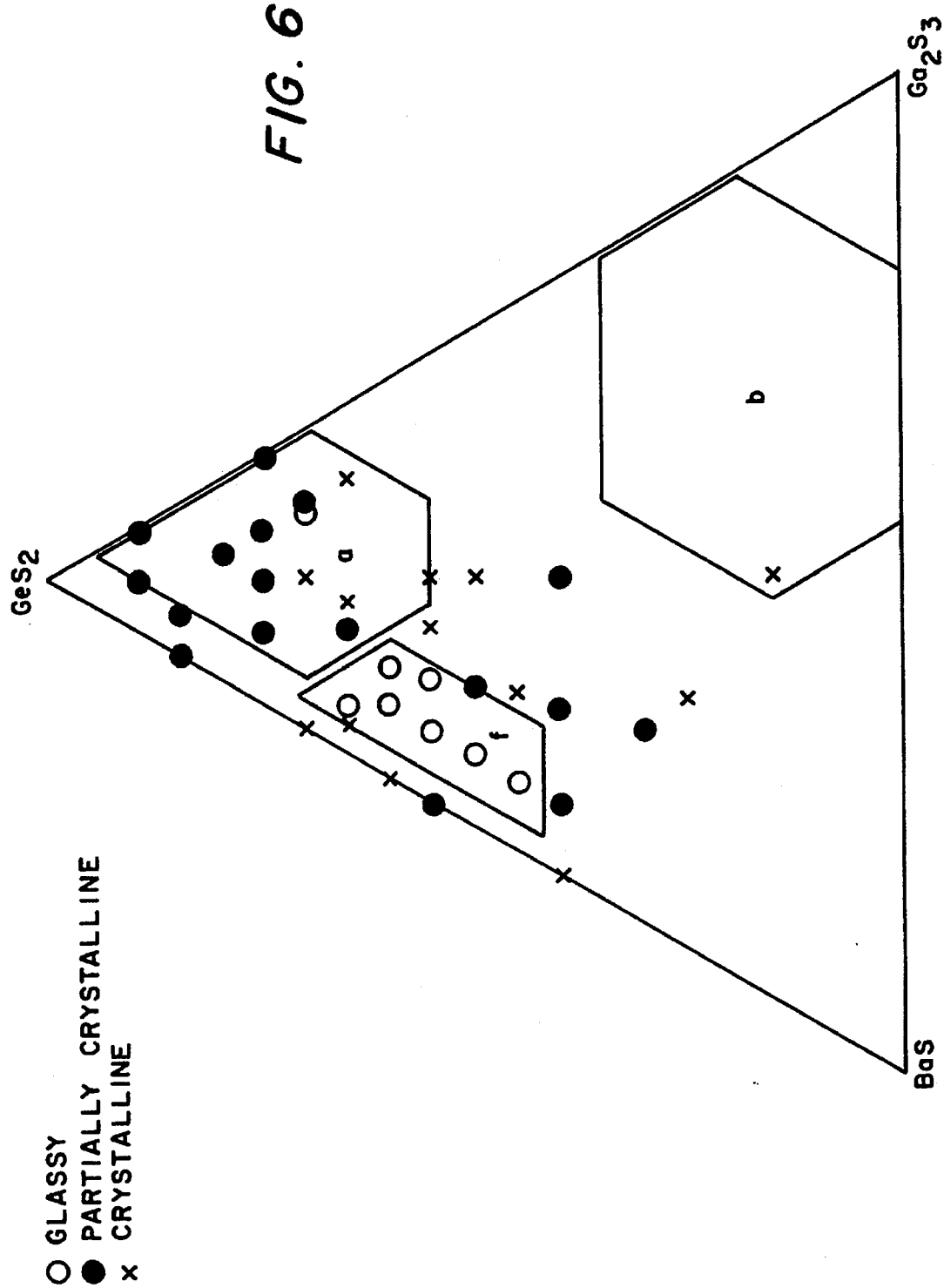

MODIFIED GERMANIUM SULFIDE GLASS

FIELD OF INVENTION

This invention pertains to a sulfide glass containing a modifier and a process for making same.

BACKGROUND OF INVENTION

Glasses based on gallium sulfide and/or germanium sulfide have been modified to improve their properties with either alkali metal sulfides or rare earth sulfides. These two families of sulfide glasses have opposite thermal properties. The sulfide glasses modified with alkali metal sulfides have glass transition temperatures ($T_g$) of less than about 300° C. and glass stability, measured as the difference between Tg and crystallization temperature ($T_x$), of about 60°–130° C. In this context, $T_g$ is defined as a temperature at which the glass viscosity is $10^{13.5}$ poise. The sulfide glasses modified with alkali metal sulfides are also hygroscopic. The sulfide glasses modified with rare earth sulfides have $T_g$ in excess of about 550° C. but glass stability of only about 50° to 130° C. The low glass stability of the sulfide glasses modified with rare earth sulfides reduces their glass-forming and optical fiber drawing ability. Furthermore, the two families of the sulfide glasses transmit light but only up to about 9 microns.

Pending in Art Unit 1108 is patent application Ser. No. 08/396,292 filed Feb. 28, 1995, on behalf of inventors Harbison, Jewell, Merzbacher and Aggarwal entitled "Alkaline Earth Modified Germanium Sulfide Glass" discloses a sulfide glass and a process for its preparation. The glass comprises, on mol basis, 20–90% germanium sulfide, 0–60% gallium sulfide, and 5–60% of a modifier selected from alkaline earth sulfides, yttrium sulfide, lanthanum sulfide, zirconium sulfide, hafnium sulfide, indium sulfide and mixtures thereof.

The Aitken et al U.S. Pat. No. 5,392,376 discloses gallium sulfide and gallium sulfide/germanium sulfide glasses for use especially in lasers, amplifiers and upconverters. These glasses are alleged to have excellent transmission far into the infrared region of the electromagnetic radiation spectrum. The gallium sulfide ($Ga_2S_3$) glasses disclosed by the Aitken et al patent have the following composition in mole percent:

| | $Ga_2S_3$ glasses |
| --- | --- |
| $Ga_2S_3$ | 40–80% |
| $RS_x$ | 0–35% |
| $Ln_nS_3$ | 1–50% |
| $MS_x$ | 1–45% |
| Cl/F | 0–10% | where R can be aluminum, tin, arsenic, germanium or indium; Ln can be a rare earth or yttrium; and M can be barium, cadmium, calcium, lead, lithium, mercury, potassium silver, sodium, strontium, thallium or tin. On a ternary component graph of FIG. 1 where $GeS_2$ is at the apex "x", $Ga_2S_3$ and/or $In_2S_3$ is at the right corner "y" and modifier M is at the left corner "z", the gallium sulfide glasses disclosed by the Aitken et al patent are represented in FIG. 1 by the 6-sided polygon "B" where the (x, y, z) coordinates for the six points f, g, h, i, j and k defining the polygon are as follows:

f=(35, 64, 1)
g=(19, 80, 1)
h=(0, 80, 20)
i=(0, 55, 45)
j=(15, 40, 45)
k=(35, 40, 25)

Although the glasses defined by polygon "B" have high $T'_g$s, their stability is very poor, as determined by the difference between $T_x$ and $T_g$, to the point that fibers free of crystals cannot be drawn. Stability of these glasses should be in excess of 150° C. and have appropriate viscosities (about $10^5$ poise) below $T_x$ to avoid crystallization on reheating to form highly transparent crystal-free optical fibers.

The gallium sulfide ($Ga_2S_3$)/germanium sulfide ($GeS_2$) glasses disclosed by the Aitken et al patent have the following composition in mole percent:

| | $Ga_2S_3/GeS_2$ glasses |
| --- | --- |
| $Ga_2S_3$ | 5–30% |
| $R_2S_3$ | 0–10% |
| $GeS_2$ | 55–94.5% |
| $MS_x$ | 0.5–25% |
| Se | 0–10% |
| Cl/F | 0–25% |
| S/Se | 85–125% | where R can be aluminum, antimony, arsenic or indium; and M can be barium, cadmium, calcium, lead, lithium, potassium, silver, sodium, strontium, tin, yttrium or a rare earth. On the ternary component graph described above, the gallium sulfide-germanium sulfide glasses disclosed by the Aitken et al patent are represented in FIG. 1 by the 5-sided polygon "A" where the (x,y,z) coordinates for the five points a, b, c, d and e defining the polygon are as follows:

a=(94.5, 5, 0.5)
b=(69.5, 30, 0.5)
c=(55, 30, 15)
d=(55, 20, 25)
e=(70, 5, 25)

The glasses defined by polygon "A" have impaired transmission due to formation of crystalline phases upon cooling from the melt.

A sulfide glass is needed that has improved physical and optical properties.

SUMMARY OF INVENTION

It is an object of this invention to provide a glass substantially free of crystallites that has broadband transmission of up to about 15 microns.

Another object of this invention is a glass substantially free of crystallites which has higher Tg, better stability in terms of the difference between Tx and Tg, and a longer light transmitting range, when compared to known sulfide glasses.

Another object of this invention is a process for improving physical and optical properties of a sulfide glass substantially free of crystallites.

These and other objects of this invention are attained by a glass substantially free of crystallites containing an effective amount of a modifier, wherein the modifier is selected from alkaline earth sulfides, yttrium sulfide, lanthanum sulfide, zirconium sulfide, hafnium sulfide or a mixture thereof. These and other objects of this invention are attained by a process for making the glass with improved physical and optical properties which includes the step of mixing with the glass components one or more of the modifiers, at least one of which is an alkaline earth or a sulfide thereof.

BRIEF DESCRIPTION OF DRAWINGS

FIG. 4 is a ternary graph of the three principal components of the glass of this invention showing polygons "A" and "B" of the Aitken et al patent, polygons "C" and "D" defining the typical embodiments of the glass of this invention, and the various glass compositions with barium sulfide as the modifier designated by open circles (o), solid circles (●) and exes (X) wherein the open circles denote glasses substantially devoid of transmission-impairing crystallites, solid circles denote partially crystalline glasses, and exes denote crystalline compositions.

FIG. 5 defines the preferred embodiment of the glass of this invention wherein the modifier is barium sulfide and the various glass compositions.

FIG. 6 defines the especially preferred embodiment of the glass of this invention with barium sulfide modifier and the various glass compositions.

DETAILED DESCRIPTION OF INVENTION

This invention pertains to a modified glass and to a process for making same. The glass can be formed from the sulfides or the elements with sulfur added in at least a stoichiometric amount. The glass has a combination of an increased glass transition temperature, greater stability $(T_g-T_e)$, and extened transmission to longer wavelengths than prior art glasses.

The glass of this invention contains germanium sulfide, gallium sulfide and/or indium sulfide and one or more modifiers selected from alkaline earth sulfides, yttrium sulfide, tin sulfide, lanthanum sulfide, zirconium sulfide, and hafnium sulfide. At least one alkaline earth sulfide modifier is present. The preferred modifiers are barium sulfide, calcium sulfide, strontium sulfide, yttrium sulfide, and lanthanum sulfide. When indium sulfide replaces at least a portion of gallium sulfide, it expands the glass forming region to encompass the broad composition range shown in FIG. 1. Another embodiment of the glass of this invention also contains a small amount of an optically active rare earth or a sulfide thereof. The sulfides of lanthanum and yttrium are not optically active. Preferred rare earth sulfides include praseodymium sulfide, neodymium sulfide, erbium sulfide, cerium sulfide, dysprosium sulfide, holmium sulfide, thulium sulfide and terbium sulfide.

Figure 1:
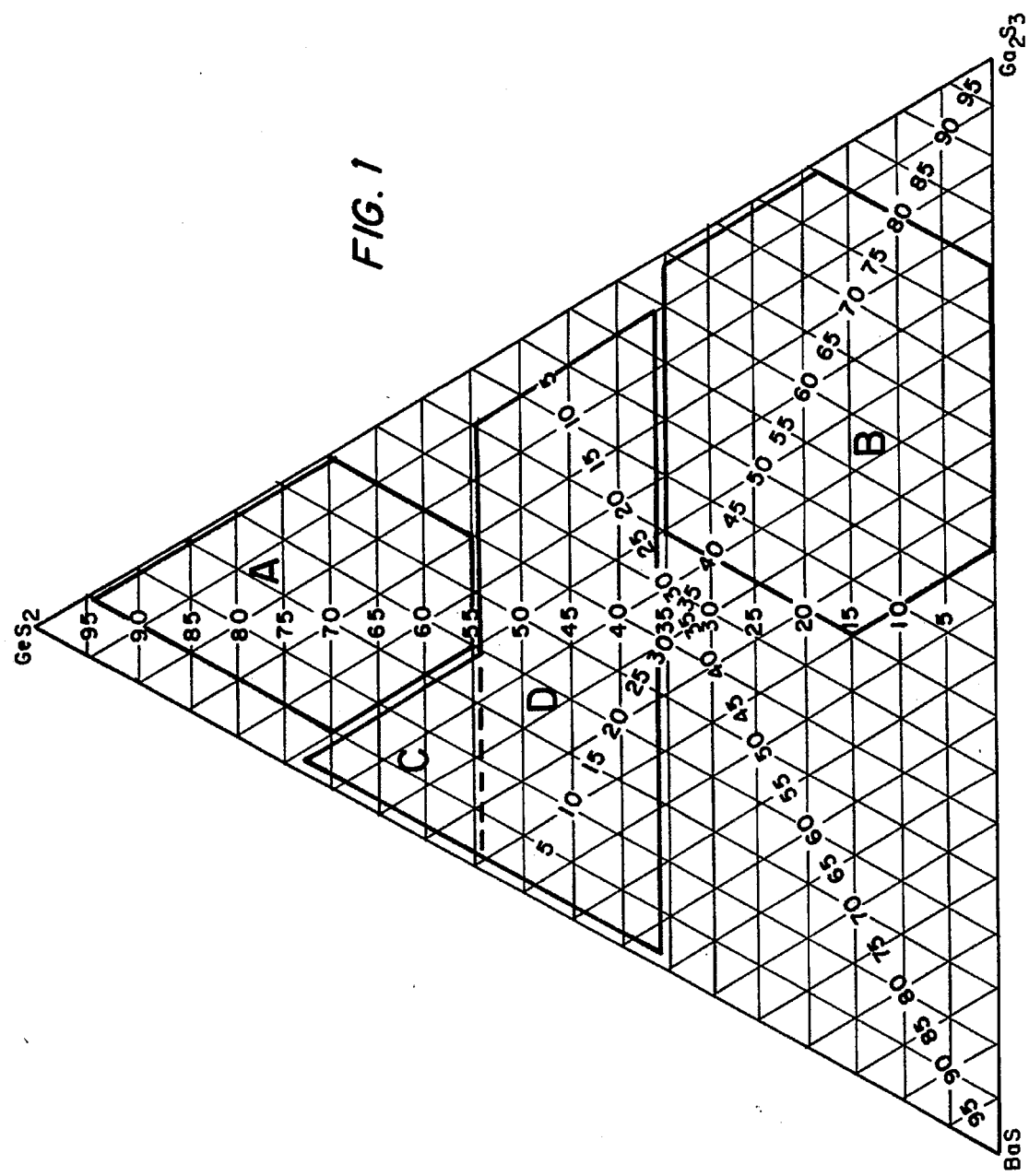
FIG. 1 is a ternary graph of germanium sulfide, gallium sulfide and/or indium sulfide and a modifier showing polygon "B" corresponding to the gallium sulfide glass and polygon "A" corresponding to the gallium sulfide-germanium sulfide glass disclosed by the Aitken et al patent; and polygons "C" and "D" corresponding to the typical embodiment of the glass of this invention.

The typical embodiment of the sulfide glass of this invention is defined by the first region C and the second region D. Regions C and D are represented in FIG. 1 as polygons "C" and "D," respectively. In the sulfide glass of this invention of the first region C, on molar basis of principal components, typical amount of germanium sulfide is 36–73%, typical amount of gallium sulfide and/or indium sulfide is 1–20%, and typical amount of a modifier is 5–63%. On molar basis, ratio in the C region is 1.2–2.8 for germanium sulfide to modifier, 0.02–0.77 for gallium sulfide and/or indium sulfide to modifier, and 2.7–73 for germanium sulfide to gallium sulfide an/or indium sulfide. In the sulfide glass of this invention of the second region D, on molar basis of the principal components, typical amount of germanium sulfide is 36–54%, typical amount of gallium sulfide and/or indium sulfide is 1–59%, and typical amount of a modifier is 5–63%. On molar basis, ratio in region D is 0.57–10.8 for germanium sulfide to modifier, 0.016–11.8 for gallium sulfide and/or indium sulfide to modifier, and 0.61–54 for germanium sulfide to gallium sulfide and/or indium sulfide.

On the ternary graph of FIG. 1, the first and the second regions C and D, which define the typical glass of this invention, are represented in FIG. 1 by the 5-sided combined polygon where the (x, y, z) coordinates for the five points l, m, n, o and p, which define the combined polygon, are as follows:

l=(54, 41, 5)

m=(36, 59, 5)

n=(36, 1, 63)

o=(73, 1, 26)

p=(54, 20, 26)

In the preferred embodiment of this invention, molar amount of germanium sulfide is 36–72%, molar amount of gallium sulfide and/or indium sulfide is 2–38%, and molar amount of the modifier is 26–62%. On molar basis, ratio of germanium sulfide to the modifier in the preferred embodiment is 0.58–2.77, ratio of gallium sulfide and/or indium sulfide to the modifier is 0.03–1.46, and ratio of germanium sulfide to gallium sulfide and/or indium sulfide is 0.95–36.

Figure 2:
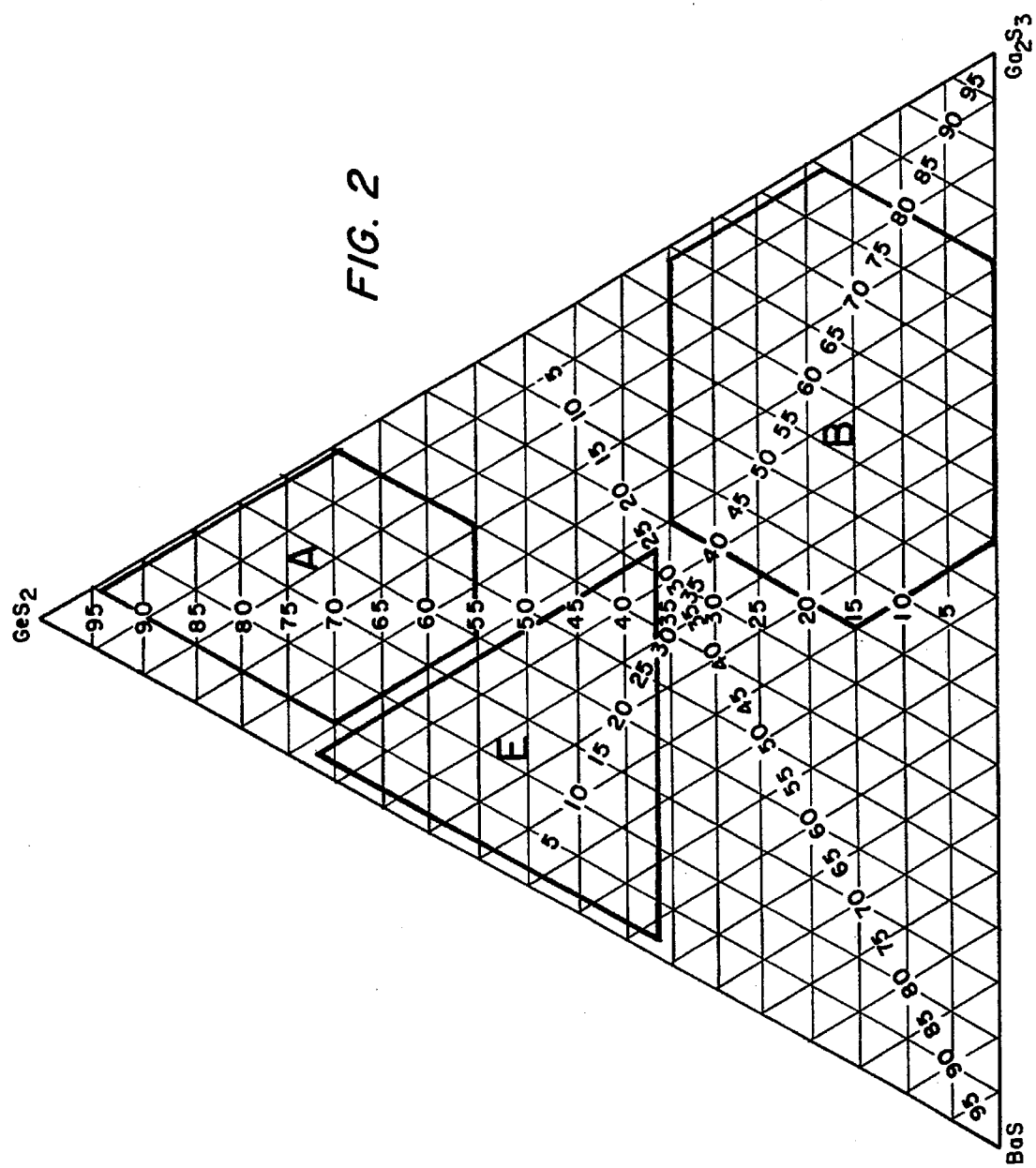
FIG. 2 is a ternary graph of the three principal components of the glass of this invention showing polygons "A" and "B" of the Aitken et al patent and polygon "E" which represents the preferred embodiment of this invention.

On the ternary graph of FIG. 2, the preferred embodiment of this invention is represented by the triangle "E" wherein the coordinates for the three points q, r and s are as follows:

q=(72, 2, 26)

r=(36, 38, 26)

s=(36, 2, 62)

In the especially preferred embodiment of this invention, molar amount of germanium sulfide is 42–71%, molar amount of gallium sulfide and/or indium sulfide is 3–14%, and molar amount of the modifier is 26–55%. On molar basis, the especially preferred embodiment has ratio of germanium sulfide to the modifier of 0.76–2.73, ratio of gallium sulfide and/or indium sulfide to the modifier of 0.05–0.54 and ratio of germanium sulfide to gallium sulfide and/or indium sulfide of 3–23.7.

The especially preferred embodiment of this invention is represented by the 4-sided polygon "F" in FIG. 3 where the coordinates for the four points t, u, v and w, which define the polygon, are as follows:

t=(71, 3, 26)

u=(60, 14, 26)

v=(42, 14, 44)

w=(42, 3, 55)

The glass of this invention yields the unexpected property of being substantially devoid of crystallites.

Amount of the optically active rare earth sulfide in the glass of this invention, if added, can vary up to about 20%, preferably 0.001–5%, and especially 0.01–2%, on a molar basis. If too much of a rare earth sulfide is added for fiber laser/amplifier applications, emission efficiency of the glass is negatively impacted. For compact laser sources, the higher level of the rare earth sulfide is preferred.

The sulfide glass of this invention has improved physical and optical properties compared to prior art sulfide glasses based on gallium sulfide and/or germanium sulfide. The improvements realized include higher glass transition temperature (Tg); better thermal stability, as measured by the difference between crystallization temperature (Tx) and glass transition temperature (Tg); and greater infrared transmission range. For the sulfide glass of this invention, Tg is greater than about 370° C., such as in the range of 370°–550° C., typically above 450° C.; thermal stability exceeds about 100° C., and is in the range of 100°–300° C., typically about 200° C.; and due to the high BaS modifier content but reduced mass, transmission of light in the infrared region is extended up to about 15 microns, and is typically in the range of 0.3–12 microns. These glasses are also more advantageous by having a low energy multiphonon absorption. Presence of an optically active rare earth sulfide results in a negligible effect on physical properties, however, its presence in the glass can result in stimulated emission of light. This renders the glass useful in certain applications, such as efficient fiber amplifiers and IR sources, which would be difficult or impossible in absence of an optically active rare earth sulfide.

Process for improving physical and optical properties of a sulfide glass and process for making the sulfide glass of this invention includes the steps of mixing components of the glass of this invention, melting the components to form the molten glass, cooling the molten glass to solidify same, and annealing the glass to relieve stresses therein in order to make it stronger.

Mixing of the components is done in a drybox maintained at less than about 1 ppm moisture and oxygen and under an inert atmosphere. Highly purified components are used in order to enhance transmission. It is preferred to use components in elemental form rather than in the salt form, i.e., as sulfides, since this leads to a glass with less impurity absorptions. All components can be purchased in the desired purity of in excess of 99.9%, on metals basis. Sulfur is presently available at a purity of about 99.995% which is further refined by distillation to remove water, oxides and carbon.

The mixing step is carried out in a drybox by first weighing out the glass components and then mixing them to distribute the components. The weighing and mixing steps are carried out in a drybox under an inert atmosphere because sulfur is hygroscopic and the alkaline earths, yttrium, zirconium, lanthanum and hafnium are highly flammable in the presence of water or oxygen. Germanium, gallium, indium and tin are not a problem in this respect. If rare earth sulfide is used in the composition, this is when the addition thereof is made, either as a rare earth sulfide or as elemental rare earth together with sulfur.

If elemental glass components are used, sulfur is included separately and forms sulfides by reacting with the other elemental glass components upon heating. The elements are weighed out and mixed in the drybox and then transferred to a receptacle which was previously cleaned and outgassed.

After transferring the glass components into the receptacle, the receptacle is closed-off and taken out of the drybox. At this point, the receptacle can be at about room temperature. After taking the receptacle out of the drybox, the receptacle is heated to melt the contents thereof and to create an environment which promotes the reaction of sulfur with the other elemental components to form sulfides at high temperature. To avoid contamination of the glass components, the receptacle should be of a material that is inert to the glass components, such as vitreous carbon.

Typically, the glass components at this point are disposed in an inert crucible which itself is placed within a silica ampoule. In this fashion, any reaction between any of the glass components and the ampoule is precluded.

Typical melting schedule involves ramping from about room temperature to about 825° C. at a rate of about 0.5°–5° C. per minute, holding at about 825° C. for about ¼ to ½ hour, ramping from about 825° C. to about 1000° C. at a rate of about 0.5°–5° C. per minute and holding at about 1000° C. for about 10 to 20 hours. After heating to the high temperature of about 1000° C., contents of the receptacle are in a liquid state and further mixing of the components takes place at the high temperature to more uniformly disperse them throughout the molten glass.

After the melting process, the molten glass is quickly cooled from about 750°–1000° C. to about Tg or below in order to solidify the glass. Annealing of the glass is accomplished after solidification by extended heating thereof in solid state at slightly above Tg in order to relieve stresses in the glass which may cause cracking/fracture. The glass is then characterized by powder x-ray diffraction and thermal analysis which is used to confirm glass formation.

If starting materials are used in the sulfide form, it is then not necessary to heat very slowly to react elemental sulfur with an elemental metal to form the sulfide salt. Slow heating allows the sulfur to fully react with the metal before generating explosive pressures which free sulfur exerts at high temperature. In the event the sulfide salt is used, higher levels of oxide and hydroxide impurities are incorporated into the glass thus reducing broadband transmission by associated absorptions.

The sulfide glass thus formed varies in color from pale yellow to black and can have transmission of above about 50% for a thickness of 0.75 mm over the range from about 0.3 up to about 12 microns. Presence of hydrogen sulfide in the glass results in some absorption at about 4 microns. Its hardness exceeds or is comparable to that of zinc sulfide.

Figure 3:
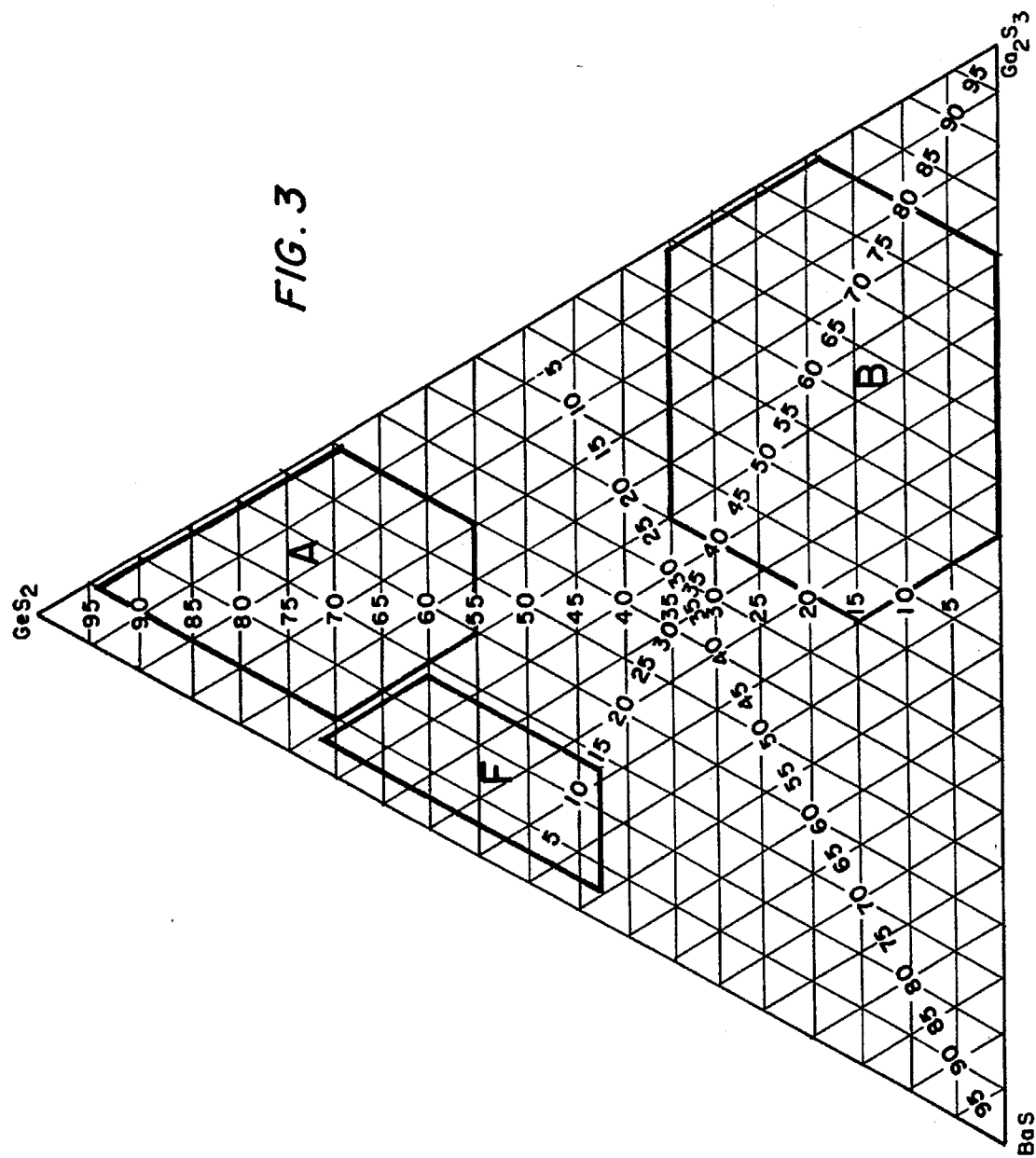
FIG. 3 is a ternary graph of the three principal components of the glass of this invention showing polygons "A" and "B" of the Aitken et al patent and polygon "F" which represents the especially preferred embodiment of this invention.

FIG. 3 demonstrates that the glasses claimed herein have the unexpected property of crystalline-free structure. Glass compositions denoted by open circles were substantially crystal-free, had in excess of about 60% transmission, and less than about 2% by volume crystallites, as determined by x-ray diffraction detection limits. Glass compositions denoted by solid circles were partially crystalline, had about 10–60% transmission, and contained about 2–50% by volume crystallites. Glass compositions denoted by exes (X's) were crystalline, had transmission below about 10%, and contained in excess of about 50% crystallites. A thickness of 1 mm of the sample was taken for transmission determinations.

Principal applications for the sulfide glass of this invention include optical fibers and domes/windows. Due to its enhanced stability and extended transmission in the infrared region, the glass of this invention can be used to make optical fibers which can be used to detect chemical species which absorb in the infrared, such as toxins in water, dumps or anywhere else where detection of a chemical species is desired. Due to the extended transmission range in the infrared region, optical fibers made from the novel sulfide glass disclosed herein, are capable of detecting more chemical species than prior art sulfide glasses. In the optical fiber application, it is preferred to substitute indium sulfide, partly or totally, for gallium sulfide in order to obtain a more stable glass in the temperature range required for fiberization.

Many glasses can transmit radiation in the region of about 3–5 microns, however, the sulfide glass disclosed herein can detect radiations in the range of up to about 15 microns.

This, of course, includes transmission in the 3–5 micron and in the 8–12 micron regions. For instance, sulfur dioxide absorption can be detected at about 4 microns and ethylene absorption can be detected at about 10.5 microns. The glass of this invention is the only known sulfide glass which can detect both sulfur dioxide and ethylene.

The glass of this invention is particularly suitable for the dome/window applications on aircraft traveling up to about Mach IV. In such applications, paramount properties include broadband infrared transparency, good mechanical properties such as high hardness and fracture toughness, and chemical stability with respect to moisture and heating in air. The glass of this invention is at least comparable and in many instances exceeds these and other relevant properties of zinc sulfide. It should be pointed out that a hot body emits maximum radiation at sea level in the approximate range of 3–5 microns whereas a cold body emits maximum radiation at sea level in the approximate range of 7–14 microns. The broadband transmission property is of particular importance in connection with smart bombs the successful use of which requires detection of radiation from hot and cold bodies.

Another important application for the glass of this invention is as optical fibers which can provide higher efficiency fiber lasers and amplifiers. The current fiber laser/amplifier materials are based on oxide or fluoride glasses which have high multiphonon absorptions at shorter wavelengths of about 2–4 microns and hence, more probable to undergo non-radiative decay. The sulfide glass of this invention offers the potential for better laser/amplifier host materials for the optically active rare earth ions by having longer wavelength multiphonon absorptions resulting in lower probability of non-radiative losses and the potential for greater excited state lifetimes.

The invention having been generally described, the following example is given as a particular embodiment of the invention to demonstrate the practice and advantages thereof. It is understood that the example is given by way of illustration and is not intended to limit in any manner the specification or any claim that follows.

EXAMPLE

This example demonstrates preparation of a sulfide glass based on gallium sulfide and germanium sulfide which glass also contained additives barium sulfide and indium sulfide.

A silica glass ampoule had a wall thickness of 3 mm, had one opening and contained a vitreous carbon crucible within. The ampoule was washed with dilute nitric acid and dried in an oven maintained at 110° C. The open end of the ampoule was then hooked up to a vacuum system consisting of a turbomolecular and mechanical pump. While the ampoule was evacuated, it was also heated using an oxygen-methane torch for about one hour until a constant vacuum was reached, indicating absence of moisture and any other gas. The evacuated ampoule at a vacuum of $1 \times 10^{-6}$ Torr was then sealed with a valve and positioned within a drybox wherein the atmosphere contained less than 1 ppm water vapor and oxygen.

The elemental glass components in particulate form were weighed in the drybox to provide the glass composition on molar basis of $(BaS)_{42.9}(In_2S_3)_{8.5}(Ga_2S_3)_{8.5}(GeS_2)_{40.1}$. Purity of the elements on metals basis, in weight percent, was 99.9% for barium, 99.99999% for indium, 99.99999% for gallium, and 99.9999% for germanium. Sulfur was obtained at a purity of 99.995%, however, it was further purified by distilling it three times to remove water vapor, oxides and carbon. After distillations, purity of sulfur was greater than 99.995%, and it was at this purity that it was used in the drybox. The total weight of this glass composition batch was 40 grams. An additional one percent by weight, or 0.40 gram, of sulfur was added to provide for volatilization losses during melting. The 40.40 gram batch consisted of 13.45 grams barium, 4.46 grams indium, 2.71 grams gallium, 6.65 grams germanium, and 13.13 grams sulfur.

The glass composition batch was then mixed for about 5 minutes with a spatula and loaded into the crucible within the ampoule. The ampoule was then sealed by means of a valve, removed from the drybox and hooked up to the vacuum system. The ampoule was evacuated for about an hour and then sealed with an oxygen-methane torch. The sealed ampoule was then placed into a furnace and the temperature in the furnace was thereafter ramped at 1° C. per minute to 1000° C., held at that temperature for 18 hours and then quenched in water. The glass components in the ampoule were solid when the ampoule was being heated but then became liquid at about 800° C. and then turned solid when the ampoule was quenched in water to about its Tg. After quenching, the glass was annealed at about 475° C. for an hour and then cooled slowly at 1° C. per minute to room temperature.

The resulting sulfide glass had Tg of 471° C.; Tx of 641° C.; hardness of 233.2 kg/mm$^2$; and absorption of 1.7 cm$^{-1}$ at 10 microns. This glass had absorption of less than 10 cm$^{-1}$ over the range of 0.3–14 microns.

A control sulfide glass component of 75 mol percent germanium sulfide and 25 mol percent gallium sulfide, prepared similarly to the above procedure, had Tg of 381.3° C. and Tx of 454.5° C.

Samples of the sulfide glass were prepared in the general manner described above with results given in Table I, below. Sample 17 corresponds to the example given above. In Table I, amounts of the glass components are given in mol percent and the glass components were gallium sulfide ($Ga_2S_3$), germanium sulfide ($GeS_2$), barium sulfide (BAS), yttrium sulfide ($Y_2S_3$), indium sulfide ($In_2S_3$), strontium sulfide (SrS), calcium sulfide (CaS), and lanthanum sulfide (LaS). Higher oxide impurities present in the sulfide salts produced glasses with higher values for $T_x$ and $T_g$, and substantial absorptions, than glasses of similar composition made from the elements limiting IR transmission.

TABLE I

| Sample No. | BaS | $Ga_2S_3$ | $GeS_2$ | $Y_2S_3$ | $In_2S_3$ | SrS | CaS | $LaS_{1.5}$ | Pr | $T_g$°C. | $T_x$°C. | Hardn. kg/mm$^2$ | Absorp. @ 10 um cm$^{-1}$ |
|---|---|---|---|---|---|---|---|---|---|---|---|---|---|
| 1 | 42.9 | 0 | 40.1 | 0 | 17.0 | 0 | 0 | 0 | 0 | 459 | 630 | 236.2 | 3.6 |
| 2 | 16.25 | 12.5 | 55.0 | 16.25 | 0 | 0 | 0 | 0 | 0 | 463 | 598 | 182.3 | 23 |
| 3 | 28.6 | 11.4 | 60.0 | 0 | 0 | 0 | 0 | 0 | 0 | 430 | 520 | 238.8 | 5.7 |
| 4 | 32.5 | 6.25 | 55.0 | 0 | 6.25 | 0 | 0 | 0 | 0 | 420 | 575 | 239.8 | 9 |

TABLE I-continued

| Sample No. | BaS | Ga$_2$S$_3$ | GeS$_2$ | Y$_2$S$_3$ | In$_2$S$_3$ | SrS | CaS | LaS$_{1.5}$ | Pr | T$_g$°C. | T$_x$°C. | Hardn. kg/mm$^2$ | Absorp. @ 10 um cm$^{-1}$ |
|---|---|---|---|---|---|---|---|---|---|---|---|---|---|
| 5 | 42.9 | 17.0 | 40.1 | 0 | 0 | 0 | 0 | 0 | 0 | 486 | 666 | 263.8 | 20 |
| 6 | 32.5 | 12.5 | 55.0 | 0 | 0 | 0 | 0 | 0 | 0 | 473 | 701 | 240.0 | 20 |
| 7 | 42.9 | 17.0 | 40.1 | 0 | 0 | 0 | 0 | 0 | 1.0 | 455 | 571 | 274.6 | 10 |
| 8 | 32.5 | 0 | 55.0 | 0 | 12.5 | 0 | 0 | 0 | 0 | 414 | 588 | 213.7 | 6 |
| 9 | 30.0 | 5.0 | 65.0 | 0 | 0 | 0 | 0 | 0 | 0 | 407 | 530 | 237.9 | 3.6 |
| 10 | 16.25 | 12.5 | 55.0 | 0 | 0 | 16.25 | 0 | 0 | 0 | 421 | 618 | 254.2 | 14 |
| 11 | 0 | 12.5 | 55.0 | 0 | 0 | 32.5 | 0 | 0 | 0 | 413 | 690 | 252.9 | 7 |
| 12 | 0 | 12.5 | 55.0 | 0 | 0 | 0 | 32.5 | 0 | 0 | 411 | 578 | 100 | 10 |
| 13 | 27.5 | 7.5 | 65.0 | 0 | 0 | 0 | 0 | 0 | 0 | 377 | 577 | 243.1 | 4.0 |
| 14 | 37.5 | 7.5 | 55.0 | 0 | 0 | 0 | 0 | 0 | 0 | 460 | 644 | 233.0 | 2.9 |
| 15 | 42.5 | 7.5 | 50.0 | 0 | 0 | 0 | 0 | 0 | 0 | 464 | 651 | 235.5 | 4.8 |
| 16 | 47.5 | 7.5 | 45.0 | 0 | 0 | 0 | 0 | 0 | 0 | 491 | 696 | 183.9 | 4.0 |
| 17 | 42.9 | 8.5 | 40.1 | 0 | 8.5 | 0 | 0 | 0 | 0 | 471 | 641 | 223.3 | 1.7 |
| 18 | 32.5 | 7.5 | 60.0 | 0 | 0 | 0 | 0 | 0 | 0 | 420 | 591 | 234.5 | 3.4 |
| 19 | 20.0 | 0 | 50.0 | 0 | 30.0 | 0 | 0 | 0 | 0 | 375 | 501 | 205.1 | 4.0 |
| 20 | 32.5 | 12.5 | 27.5 | 0 | 0 | 0 | 0 | 27.5 | 0 | 549 | 720 | 272.7 | 5.1 |
| 21 | 38.6 | 7.6 | 36.2 | 0 | 7.6 | 0 | 0 | 0 | 10.0 | 426 | 522 | 262.9 | 7.0 |

In sample 7 of Table 1, above, where praseodymium is given as 1.0%, it was batched as a one weight percent addition to the base melt.

Many modifications and variations of the present invention are possible in light of the above techniques. It is, therefore, to be understood that within the scope of the appended claims, the invention may be practiced otherwise than as specifically described.

What is claimed is:

1. A glass substantially free of crystallites defined by a polygon having x, y, and z coordinates for points l, m, n, o and p on a ternary graph wherein 100% germanium sulfide is at the apex x, 100% gallium sulfide/indium sulfide is at the bottom right corner y, and 100% sulfide modifier selected from the group consisting of: alkaline earth sulfides, yttrium sulfide, tin sulfide, lanthanum sulfide, zirconium sulfide, hafnium sulfide, and mixtures thereof is at the left bottom right z, wherein the points are defined as follows:

l=(54, 41, 5)
m=(36, 59, 5)
n=(36, 1, 63)
o=(73, 1, 26)
p=(54, 20, 26).

2. A glass substantially free of crystallites defined by a polygon having x, y, and z coordinates for points q, r, and s on a ternary graph wherein 100% germanium sulfide is at the apex x, 100% gallium sulfide/indium sulfide is at the bottom right corner y, and 100% sulfide modifier selected from the group consisting of: alkaline earth sulfides, yttrium sulfide, tin sulfide, lanthanum sulfide, zirconium sulfide, hafnium sulfide, and mixtures thereof is at the bottom left corner z, wherein the points are defined as follows:

q=(72, 2, 26)
r=(36, 38, 26)
s=(36, 2, 62).

3. A glass substantially free of crystallites wherein transmission of said glass is over the range of up to about 15 microns and wherein said glass is defined by a polygon having x, y, and z coordinates for points t, u, v, and w on a ternary graph wherein 100% germanium sulfide is at the apex x, 100% sulfide gallium sulfide/indium sulfide is at the bottom right corner y, and 100% modifier selected from the group consisting of: alkaline earth sulfides, yttrium sulfide, tin sulfide, lanthanum sulfide, zirconium sulfide, hafnium sulfide, and mixtures thereof is at the bottom left corner z, wherein the points are defined as follows:

t=(71, 3, 26)
n=(60, 14, 26)
v=(42, 14, 44)
w=(42, 3, 55).

4. The glass of claim 2 wherein the sulfide modifier is selected from the group consisting of barium sulfide, strontium sulfide, calcium sulfide, yttrium sulfide, lanthanum sulfide, and mixtures thereof.

5. The glass of claim 3 further including up to about 20%, on mol basis, of at least one optically active rare earth sulfide to provide quantum efficiencies for stimulated emission of about 2–99%, said glass having T$_g$ greater than about 370° C.; and thermal stability exceeding about 100° C., as measured by the difference between T$_g$ and T$_x$.

6. The glass of claim 5 wherein the sulfide modifier is selected from the group consisting of barium sulfide, strontium sulfide, calcium sulfide, yttrium sulfide, lanthanum sulfide, and mixtures thereof.

7. The glass of claim 6 wherein amount of said optically active rare earth is 0.01–2% selected from the group consisting of praseodymium sulfide, neodymium sulfide, erbium sulfide, terbium sulfide, thullium sulfide, cerium sulfide, holmium sulfide, dyprosium sulfide, and mixtures thereof; in said glass, purity of germanium in said germanium sulfide is about 99.9999%, purity of gallium or indium in said gallium sulfide or said indium sulfide, if present, is about 99.99999%, purity of the alkaline earth is about 99.9%, and purity of sulfur in said sulfides present in said glass is greater than 99.995%, if elemental components of said glass are used.

8. The glass of claim 7 having thermal stability, as measured by the difference between Tg and Tx, of 100°–300° C. and transmission of radiation having wavelength in the range of 0.3–12 microns.

* * * * *